(12) United States Patent
Kikukawa et al.

(10) Patent No.: US 8,520,481 B2
(45) Date of Patent: Aug. 27, 2013

(54) OPTICAL RECORDING MEDIUM, AND SERIES OF OPTICAL RECORDING MEDIA

(75) Inventors: Takashi Kikukawa, Tokyo (JP); Atsuko Kosuda, Tokyo (JP); Motohiro Inoue, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/032,258

(22) Filed: Feb. 22, 2011

(65) Prior Publication Data

US 2011/0205867 A1    Aug. 25, 2011

(30) Foreign Application Priority Data

Feb. 22, 2010    (JP) .................................. 2010-035812

(51) Int. Cl.
*G11B 7/00*    (2006.01)

(52) U.S. Cl.
USPC ........................................ 369/94; 369/275.3

(58) Field of Classification Search
USPC ................. 369/94, 275.1, 275.2, 275.3, 75.4, 369/93
See application file for complete search history.

(56) References Cited

U.S. PATENT DOCUMENTS

| | | | |
|---|---|---|---|
| 7,221,644 B2 | 5/2007 | Kobayashi et al. | |
| 7,567,493 B2* | 7/2009 | Hong et al. | 369/94 |
| 7,697,407 B2* | 4/2010 | Mishima et al. | 369/275.5 |
| 7,778,135 B2* | 8/2010 | Anzai et al. | 369/94 |
| 7,852,721 B2 | 12/2010 | Kikukawa et al. | |
| 7,948,853 B2 | 5/2011 | Fujita | |
| 2010/0309759 A1* | 12/2010 | Sato et al. | 369/44.26 |
| 2011/0206889 A1 | 8/2011 | Mitsumori et al. | |

FOREIGN PATENT DOCUMENTS

| | | |
|---|---|---|
| JP | 2003346379 A | 12/2003 |
| JP | 2008097694 A | 4/2008 |
| JP | 2009020972 A | 1/2009 |
| JP | 2009140552 A | 6/2009 |
| WO | 2010013321 A1 | 2/2010 |

OTHER PUBLICATIONS

Ichimura et al., "Proposal for a Multilayer Read-Only-Memory Optical Disc Structure", Applied Optics 45 (8):1794-1803 (2006).
Mishima et al., "150 GB, 6-Layer Write Once Disc for Blu Ray Disc System", Proc. of SPIE 6282 628201-1-628201-11 (2006).

* cited by examiner

*Primary Examiner* — Nabil Hindi
(74) *Attorney, Agent, or Firm* — Porzio, Bromberg & Newman, P.C.

(57) ABSTRACT

In a multilayer optical recording medium, it is an object to suppress generation of crosstalk while reducing an interlayer distance of recording and reading layers. In an optical recording medium including three or more recording and reading layers, a first distance, and a second distance greater than the first distance by 3 μm or more are alternately defined as interlayer distances of recording and reading layers.

8 Claims, 6 Drawing Sheets

OPTICAL RECORDING MEDIUM, AND SERIES OF OPTICAL RECORDING MEDIA

BACKGROUND OF THE INVENTION

1. Field of the Invention

The present invention relates to an optical recording medium including a plurality of recording and reading layers, and a series of optical recording media made by preparing optical recording media of a plurality of types.

2. Description of the Related Art

Conventionally, optical recording media such as CD-DAs, CD-ROMs, CD-Rs, CD-RWs, DVD-ROMs, DVD-Rs, DVD+/−RWs, DVD-RAMs, Blu-ray Discs (BD) are widely used to view digital video contents and to record digital data. In the BD standard, which is one of the next generation DVD standards, the wavelength of the laser beam used for recording and reading is reduced to 405 nm, and the numerical aperture of an objective lens is set to 0.85. In optical recording media conforming to the BD standard, tracks are formed at 0.32 µm pitch. This enables 25 GB or more data to be recorded on and read from one recording and reading layer of such an optical recording medium.

It is expected that the size of video and data files will increase more and more in the future. Therefore, it is contemplated to increase the capacities of optical recording media by using a multiple stack of recording and reading layers. In the technologies for BD standard optical recording media reported by I. Ichimura et al., Appl. Opt., 45, 1974-1803 (2006) and K. Mishima et al., Proc. of SPIE, 6282, 62820I (2006), 6 to 8 recording and reading layers are provided to achieve ultra large capacities as much as 200 GB.

In a multilayer optical recording medium, crosstalk of a signal of a different recording and reading layer, or of noise is generally generated during recording and reading of a target recording and reading layer. This results in degradation of the quality of a servo signal or a recording signal.

The aforementioned crosstalk includes two types: interlayer crosstalk and confocal crosstalk. The interlayer crosstalk is a phenomenon generated by interference of light reflected from a recording and reading layer adjacent to a recording and reading layer being read into reading light. Accordingly, this crosstalk is always a matter of concern in an optical recording medium including two or more recording and reading layers. Increasing an interlayer distance reduces the interlayer crosstalk. However, increasing an interlayer distance in turn makes it impossible to increase the number of recording and reading layers.

The confocal crosstalk is specific to an optical recording medium including three or more layers. The confocal crosstalk is a phenomenon generated by the fact that main reading light reflected from a target recording and reading layer, and stray light reflected from a different recording and reading layer a plurality of times have the same optical path length. The intensity of stray light determined by the product of reflectances of reflections decreases with a larger number of reflections. Accordingly, for practical purposes, considering the case of three reflections is sufficient. A technique of making all interlayer distances (thicknesses of intermediate layers) different is known to prevent the confocal crosstalk.

However, making the thicknesses of intermediate layers different from each other in order to increase the number of recording and reading layers requires intermediate layers of various thicknesses. This only results in a greater intermediate distance. Thus, a recording and reading layer farthest from a light incident surface goes farther from the light incident surface, causing an adverse effect on a coma aberration due to a tilt and the like.

Furthermore, in the optical recording medium of this type, projections and depressions, such as grooves and lands, for tracking control should be formed in each recording and reading layer. Thus, projections and depressions should be formed in each intermediate layer with a stamper, so that an error is likely to be generated in the thicknesses of the intermediate layers. Such an error in film deposition should be considered if the thicknesses of the intermediate layers are to be made different from each other as described above. This disadvantageously increases the thickness of the optical recording medium further.

The present invention has been made in view of the above problems, and it is an object of the invention to provide an optical recording medium including three or more layers, the optical recording medium being capable of reasonably realizing reduction of an interlayer distance and reduction of crosstalk at the same time.

SUMMARY OF THE INVENTION

The present inventors have made extensive studies, and the above object is achieved by the following means.

To achieve the above object, the present invention provides an optical recording medium including three or more recording and reading layers. In the optical recording medium, a first distance, and a second distance greater than the first distance by 3 µm or more are alternately defined as interlayer distances of the recording and reading layers.

In the optical recording medium provided to achieve the above object, the first distance is set at 10 µm or more.

In the optical recording medium provided to achieve the above object, the second distance is greater than the first distance by 4 µm or more.

In the optical recording medium provided to achieve the above object, the second distance is greater than the first distance by a range of from 3 µm to 5 µm.

In the optical recording medium provided to achieve the above object, the first and second distances are 12 µm and 16 µm, respectively.

In the optical recording medium provided to achieve the above object, a total reflectance R is set at 2% or less in all the recording and reading layers, the total reflectance R indicating a ratio between incoming light and outgoing light on a light incident surface determined when the recording and reading layers are irradiated with a beam.

In the optical recording medium provided to achieve the above object, when a recording and reading layer that is at an $n^{th}$ place from the light incident surface is defined as an $n^{th}$ recording and reading layer (n is a natural number), a total reflectance indicating a ratio between incoming light and outgoing light on the light incident surface determined is defined as $R_n$ and a virtual single-layer reflectance of the $n^{th}$ recording and reading layer is defined as $r_n$ when the $n^{th}$ recording and reading layer is irradiated with a beam, and the single-layer reflectance $r_n$ is expressed as $(R_{n-1}^{(n-1)}/R_n^{(n-2)})$, the single-layer reflectance $r_n$ is set at 10% or less in all the recording and reading layers.

In the optical recording-reading method provided to achieve the above object, the recording and reading layers have a planar structure with no projections and depressions for tracking control, and a servo layer with projections and depressions for tracking control is provided, so that information can be recorded on the recording and reading layers while performing tracking control by using the servo layer.

In the optical recording-reading method provided to achieve the above object, a track pitch of projections and depressions for tracking control is twice a track pitch of recording marks to be recorded on the recording and reading layers.

To achieve the above object, the present invention provides a series of optical recording media including a plurality of the optical recording media according to any one of the inventions recited above. In the series of optical recording media, the plurality of optical recording media have different numbers of the stacked recording and reading layers, positions of servo layers with respect to the corresponding light incident surfaces are standardized among the plurality of optical recording media, and the plurality of optical recording media have standardized positions of at least three recording and reading layers with respect to the corresponding light incident surfaces.

The present invention can provide an optical recording medium that suppresses the generation of crosstalk while reducing an interlayer distance of recording and reading layers.

DETAILED DESCRIPTION OF THE PREFERRED EMBODIMENTS

Preferred embodiments of the present invention will next be described with reference to the accompanying drawings.

Figure 1:
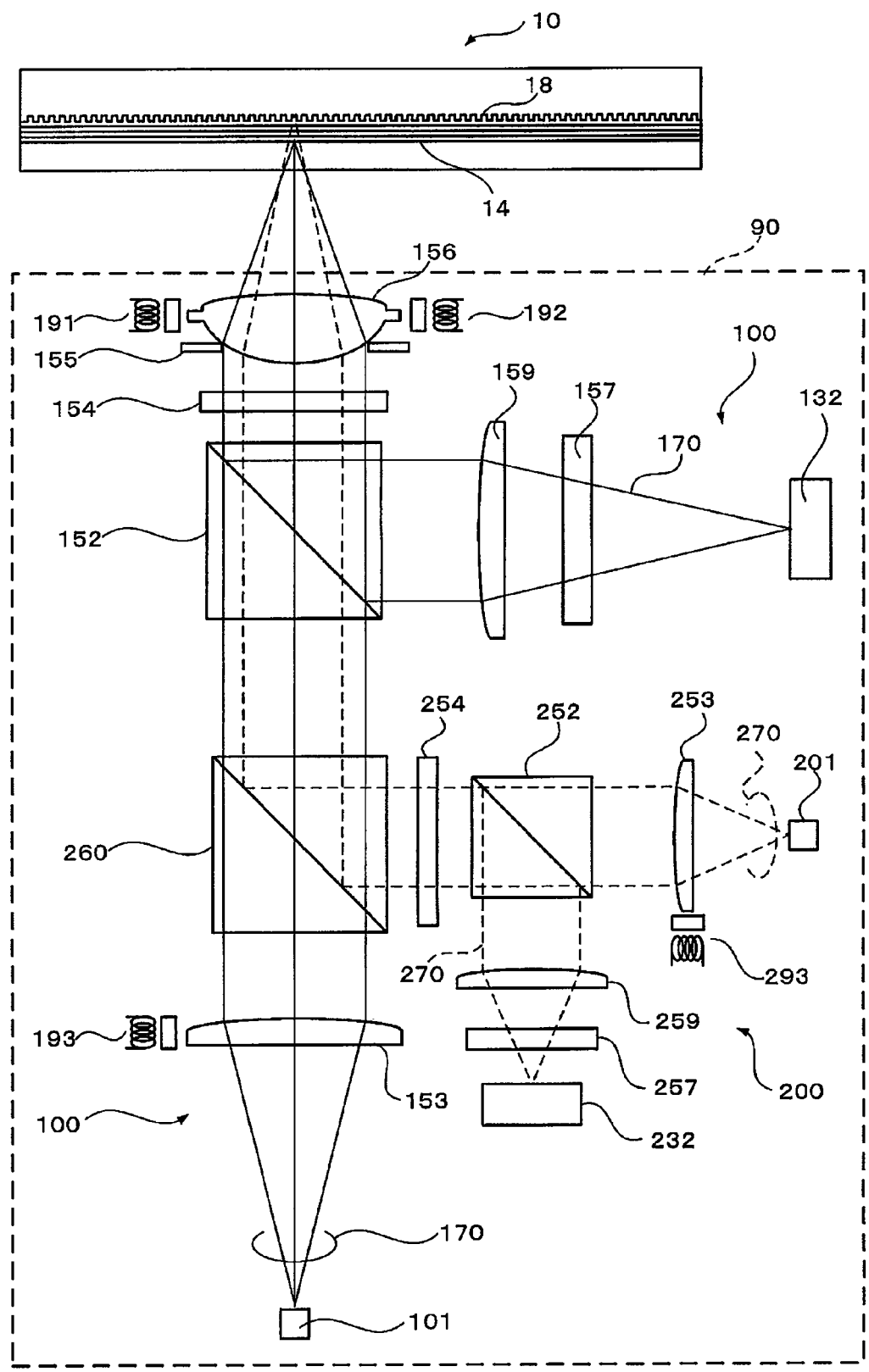
FIG. 1 is a block diagram illustrating the structure of an optical pickup for recording and reading an optical recording medium according to a first embodiment.

FIG. 1 shows the structure of an optical recording medium 10 according to a first embodiment and the structure of an optical pickup 90 used to record and read the optical recording medium 10. The optical pickup 90 includes a first optical system 100 and a second optical system 200. The first optical system 100 is used to record and read a recording and reading layer group 14 in the optical recording medium 10. The second optical system 200 is used for tracking control using a servo layer 18 (described later) when information is recorded on the recording and reading layer group 14 using the first optical system 100.

A diverging beam 170 emitted from a light source 101 of the first optical system 100 and having a relatively short blue wavelength (380 to 450 nm, 405 nm in this optical pickup) passes through a collimating lens 153 provided with spherical aberration correction means 193 and through a wavelength selection filter 260 of the second optical system 200 and enters a polarizing beam splitter 152. The beam 170 entering the polarizing beam splitter 152 passes therethrough and then through a ¼ wavelength plate 154 and is thereby converted to a circularly polarized beam. The circularly polarized beam is then converted to a converging beam through an objective lens 156. The resultant beam 170 is focused on one of a plurality of recording and reading layers in the recording and reading layer group 14 formed in the optical recording medium 10.

The aperture of the objective lens 156 is restricted by an aperture stop 155 to set the numerical aperture NA to 0.70 to 0.90 (0.85 in this optical pickup). The beam 170 reflected from, for example, the recording and reading layer group 14 passes through the objective lens 156 and then through the ¼ wavelength plate 154 and is thereby converted to a linearly polarized beam with the polarization plane rotated 90° relative to that in the outward path. Then, the resultant beam is reflected from the polarizing beam splitter 152. The polarizing beam splitter 152 has wavelength selectivity. More specifically, the polarizing beam splitter 152 allows the beam 170 from the light source 101 of the first optical system 100 to be reflected therefrom but always transmits a beam 270 (described later) emitted from the second optical system 200 and having a relatively long red wavelength.

The beam 170 reflected from the polarizing beam splitter 152 passes through a condensing lens 159 and is thereby converted to a converging beam. The converging beam passes through a cylindrical lens 157 and is incident on a photodetector 132. When the beam 170 passes through the cylindrical lens 157, astigmatism is given to the beam 170.

The photodetector 132 has four light receiving units (not shown), and each of the light receiving units outputs a current signal according to the amount of light received. The current signals are used to generate a focus error (hereinafter abbreviated as FE) signal using the astigmatic method, a tracking error (hereinafter abbreviated as TE) signal using the push-pull method (the TE signal is generated only during reading), a reading signal of information recorded on the optical recording medium 10, and other signals. The FE and TE signals are amplified to desired levels, subjected to phase compensation, and then supplied to actuators 191 and 192 as feedback to perform focus control and tracking control. The tracking control by the first optical system 100 is used only for reading.

The diverging beam 270 emitted from a light source 201 of the second optical system 200 and having a wavelength of 630 to 680 nm (650 nm in this optical pickup) passes through a collimating lens 253 provided with spherical aberration correction means 293 and enters a polarizing beam splitter 252. The beam 270 entering the polarizing beam splitter 252 passes therethrough and then through a ¼ wavelength plate 254 for the second optical system and is thereby converted to a circularly polarized beam. The circularly polarized beam is reflected from the wavelength selection filter 260 and passes through the polarizing beam splitter 152, which is shared with the first optical system 100. The beam 270 is then converted to a converging beam through the objective lens 156. The resultant beam 270 is focused on the servo layer 18 formed in the optical recording medium 10. The beam 270 reflected from the servo layer 18 passes through the objective lens 156 and then through the polarizing beam splitter 152 and is reflected from the wavelength selection filter 260 of the second optical system 200. The reflected beam 270 passes through the ¼ wavelength plate 254 and is thereby converted to a linearly polarized beam with the polarization plane rotated 90° relative to that in the outward path. Then, the resultant beam is reflected from the polarizing beam splitter 252. The beam 270 reflected from the polarizing beam splitter 252 passes through a condensing lens 259 and is thereby converted to a converging beam. The converging beam passes through a cylindrical lens 257 and is then incident on a photodetector 232. When the beam 270 passes through the cylindrical lens 257, astigmatism is given to the beam 270.

The photodetector 232 has four light receiving units (not shown), and each of the light receiving units outputs a current signal according to the amount of light received. The current signals are used to generate a focus error (FE) signal using the astigmatic method and a tracking error (TE) signal using the push-pull method. If information is recorded also on the servo layer 18, a reading signal is also generated.

When information is recorded on the recording and reading layer group 14 using the first optical system 100, the TE signal from the second optical system 200 is amplified to a desired level, subjected to phase compensation, and then supplied to the actuators 191 and 192 as feedback to perform tracking control. Therefore, the first optical system 100 records information on the recording and reading layer group 14 under the tracking control by the second optical system 200. In the present embodiment, when information recorded on the recording and reading layer group 19 is read, the first optical system 100 itself performs tracking control using recording marks on the recording and reading layer group 14. Of course, the information can be read under tracking control by the second optical system 200.

Figure 2:
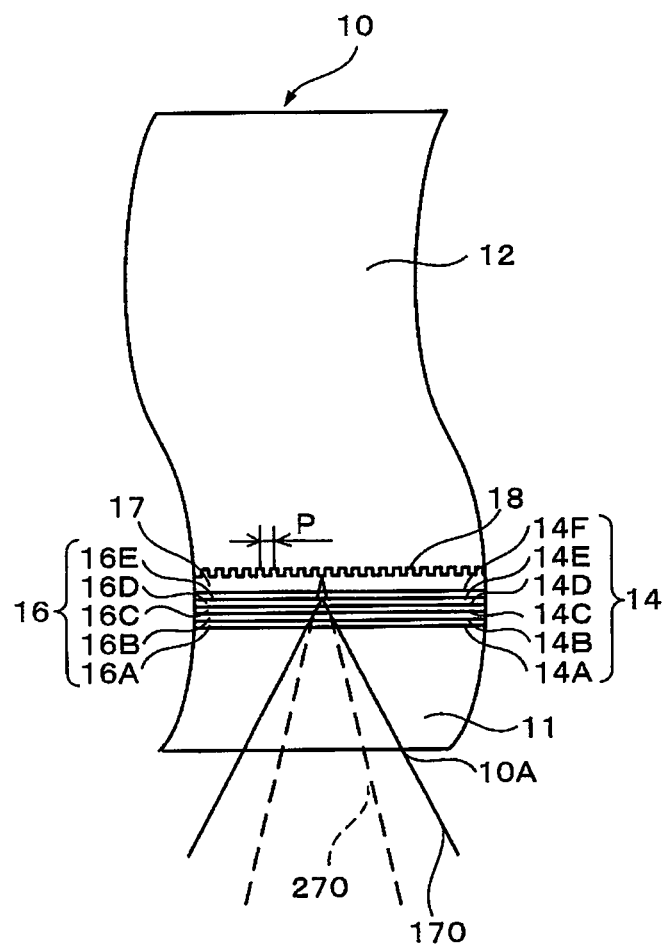
FIG. 2 is a sectional view illustrating the stacking structure of the optical recording medium according to the first embodiment.

FIG. 2 shows the enlarged cross-sectional structures of the optical recording medium 10 according to the present embodiment.

The optical recording medium 10 has a disc shape having an outer diameter of approximately 120 mm and a thickness of approximately 1.2 mm. The optical recording medium 10 includes, in order from a light incident surface 10A, a cover layer 11, the recording and reading layer group 14, an intermediate layer group 16, a spacer layer 17, the servo layer 18, and a support substrate 12.

In this embodiment, the recording and reading layer group 14 includes first to sixth recording and reading layers 14A to 14F, and information can be recorded on each recording and reading layer. Each of the first to sixth recording and reading layers 14A to 14F has a flat structure with no projection and depression for tracking control. When any of the first to sixth recording and reading layers 14A to 14F is irradiated with the high-energy recording beam 170 emitted from the first optical system 100, recording marks are formed. The types of the recording and reading layers in the recording and reading layer group 14 include a write-once type in which information can be additionally written but the written information is not rewritable and a rewritable type in which information is rewritable.

The support substrate 12 is a disc-shaped substrate having a diameter of 120 mm and a thickness of 1.0 mm, which is employed to ensure the thickness required for the optical recording medium (about 1.2 mm). The servo layer 18 is formed on a surface of the support substrate 12 that is on the side toward the light incident surface 10A. More specifically, a spiral groove and a spiral land are formed on the support substrate 12 on the side toward the light incident surface 10A so as to extend from the vicinity of its center toward its outer edge. The land and groove serve as a projection and a depression (recess) for tracking control, and the beam 270 from the second optical system 200 is guided by the groove and land.

Various materials can be used as the material for the support substrate 12. For example, glass, ceramic, and resin can be used. It is preferable to use a resin because of its good moldability. Example of the resin include polycarbonate resins, olefin resins, acrylic resins, epoxy resins, polystyrene resins, polyethylene resins, polypropylene resins, silicone resins, fluorine-based resins, ABS resins, and urethane resins. Of these, polycarbonate resins and olefin resins are particularly preferred because of their processability. The support substrate 12 does not serve as an optical path of the beam 270 and therefore need not have high light transmittance.

The servo layer 18 formed on the support substrate 12 is prepared by forming projections and depressions (grooves and lands) for tracking control and a reflective layer on the surface of the support substrate 12. The servo layer 18 may be formed as a layer of a metal such as Ag so as to function as a light reflecting film. If necessary, a reflective recordable layer may be provided.

A track pitch P of the projections and depressions for tracking control in the servo layer 18 is set to a value twice the track pitch of recording marks to be recorded on the recording and reading layers 14A to 14F. More specifically, the track pitch of the recording marks to be formed on the recording and reading layers 14A to 14F is about 0.32 µm to support the BD standard. Therefore, the track pitch P of the grooves and lands of the servo layer 18 is set to about 0.64 µm. When the track pitch P is about 0.64 µm, sufficient tracking can be achieved even with the beam 270 having a relatively long wavelength in the red wavelength range. In particular, in the present embodiment, tracking is performed using both the groove and land. Therefore, although the pitch of the projections and depressions is about 0.64 µm, the track pitch of recording marks recorded on the recording and reading layers 19A to 14F can be about 0.32 µm, which is one half of the pitch of the projections and depressions 18A and 19A. Thus, the track pitch of the recording marks on the recording and reading layer group 14 can be halved without reducing the track pitch of the servo layer 18, thereby increasing storage capacity.

The spacer layer 17 is formed of a light-transmitting ultraviolet curable acrylic resin, and has a thickness of 90 µm.

The recording and reading layer group 14 is arranged on the spacer layer 17 on the side toward the light incident surface 10A. The recording and reading layer group 14 includes the first to sixth recording and reading layers 14A to 14F stacked in this order from the light incident surface 10A. The first to sixth recording and reading layers 14A to 14F each have a three-film structure (not shown) having dielectric films formed on opposite sides of a write-once type recording film. Each of the first to sixth recording and reading layers 14A to 14F has light reflectance, absorbance, transmittance, and other properties optimized for the beam 170 in the blue wavelength range (short wavelength range) from the first optical system 100 and allows sufficient transmission of the beam 270 in the red wavelength range (long wavelength range) from the second optical system 200.

The dielectric films in each recording and reading layer have a basic function of protecting the write once type recording film and also play a role in increasing the differences in optical properties before and after the formation of recording marks.

When the beam 170 is applied, the recording sensitivity is likely to decrease if the energy absorbed by the dielectric films is large. To prevent the reduction in the recording sensitivity, it is preferable to select a material having a low absorption coefficient (k) for the wavelength range of 380 nm to 450 nm (particularly at 405 nm) as the material for the dielectric films. In this embodiment, $TiO_2$ is used as the material for the dielectric films.

The write once type recording film sandwiched between the dielectric films is used to form irreversible recording marks, and the regions in which the recording marks have been formed have a reflectance for the beam 170 significantly different from that of the other regions (blank regions). The recording and reading of data are thereby achieved. Also the write once type recording film has high transmittance for the tracking beam 270 in the red wavelength range from the second optical system 200.

The write once type recording film is formed mainly of a material containing Bi and O. The write once type recording film functions as an inorganic reactive film, and its reflectance is largely changed chemically or physically by the heat of a laser beam. Preferred examples of the material for the write once type recording film include materials containing Bi and O as main components and materials containing Bi, M, and O as main components (wherein M is at least one element selected from among Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material for the write once type recording film.

In the above description, the write once type recording film is used for each of the first to sixth recording and reading layers 14A to 14F. However, a phase change recording film that allows repeated recording can be used. In such a case, it is preferable to use SbTeGe as the main components of the phase change recording film.

The intermediate layer group 16 includes first to fifth intermediate layers 16A to 16E that are stacked between the first to sixth recording and reading layers 14A to 14F, and in order of increasing distance from the light incident surface 10A. Each of the intermediate layers 16A to 16E is formed of an ultraviolet curable acrylic or epoxy resin. The thicknesses of the intermediate layers 16A to 16E are set such that a first distance T1 that is 10 μM or more, and a second distance T2 that is greater than the first distance T1 by 3 μm or more are alternately defined. Specifically, it is preferable that a difference between the first and second distances T1 and T2 be from 3 μm to 5 μm. It is further preferable that this difference be 4 μm or more.

In the optical recording medium 10, the first and second distances T1 and T2 are set at 12 μm and 16 μm, respectively. The thicknesses of the first, second, third, fourth, and fifth intermediate layers 16A, 16B, 16C, 16D, and 16E are 16 μm, 12 μm, 16 μm, 12 μm, and 16 μm, respectively. That is, the intermediate layers of two types of thicknesses (16 μm and 12 μm) are alternately stacked. This reduces both interlayer crosstalk and confocal crosstalk, as described in detail later.

As in the intermediate layer group 16, the cover layer 11 is formed of a light-transmitting ultraviolet curable acrylic resin, and the thickness thereof is set to 38 μm.

As a result of the aforementioned structure of the optical recording medium 10, the servo layer 18 is positioned at a distance of 0.2 min (200 μm) from the light incident surface 10A. The sixth recording and reading layer 14F farthest from the light incident surface 10A of the recording and reading layer group 14 is positioned at a distance of 0.11 mm (110 μm) from the light incident surface 10A. The fifth, fourth, third, and second recording and reading layers 14E, 14D, 14C, and 14B are positioned at distances of 94 pin, 82 μm, 66 μm, and 54 μm from the light incident surface 10A, respectively. The first recording and reading layer 14A nearest the light incident surface 10A is positioned at a distance of 38 μm from the light incident surface 10A. The total thickness of the recording and reading layer group 14 (the distance from the first recording and reading layer 14A to the sixth recording and reading layer 14F) is 72 μm.

Next, a method of manufacturing the optical recording medium 10 will be described. First, a support substrate 12 having a groove and a land formed thereon is produced by injection molding of a polycarbonate resin by using a metal stamper. The method of producing the support substrate 12 is not limited to injection molding, and any other method such as a 2P method may be used.

Next, the servo layer 18 is formed on a surface of the support substrate 12 in which the grooves and lands are defined. The servo layer 18 is prepared by forming a reflective metal layer by sputtering using an Ag alloy. Further, the spacer layer 17 is formed on the servo layer 18. The spacer layer 17 is formed, for example, by applying an ultraviolet curable acrylic or epoxy resin of a controlled viscosity by, for example, spin coating, and by curing the applied resin by irradiation with ultraviolet rays. Instead of using the ultraviolet curable resin, a light-transmitting sheet made of a light-transmitting resin may be fixed onto the servo layer 18 with a bonding agent, an adhesive agent and the like to form the spacer layer 17.

Next, the sixth recording and reading layer 14F is formed. Specifically, a dielectric film, a write-once recording film, and a dielectric film are formed in this order by a vapor deposition process which is preferably a sputtering process. The fifth intermediate layer 16E is thereafter formed on the sixth recording and reading layer 14F. To form the fifth intermediate layer 16E, for example, a coating of an ultraviolet curable resin having a controlled viscosity is formed by, for example, spin coating and then irradiated with ultraviolet rays to cure the resin. These procedure is repeated to sequentially stack the fifth recording and reading layer 14E, the fourth intermediate layer 16D, the fourth recording and reading layer 14D, the third intermediate layers 16C, and the remaining layers that are placed on above another.

After formation of the first recording and reading layer 14A, the cover layer 11 is formed on the first recording and reading layer 14A to complete the formation of the optical recording medium 10. To form the cover layer 11, for example, a coating of an ultraviolet curable acrylic or epoxy resin having a controlled viscosity is formed by, for example, spin coating and then irradiated with ultraviolet rays to cure the resin. In the present embodiment, the manufacturing method described above is used. However, the present invention is not limited to the manufacturing method described above, and other manufacturing techniques may be used.

Next, a description will be given of a procedure of recording and reading information on/from the optical recording medium 10 using the optical pickup 90.

In order to record information the sixth recording and reading layer 14F of the optical recording medium 10, the servo layer 18 is first irradiated with the beam 270 in the red wavelength range from the second optical system 200 to perform tracking control. Simultaneously with the above operation, the sixth recording and reading layer 14F is irradiated with the recording beam 170 in the blue wavelength range from the first optical system 100. The basic specifications of this optical recording medium series and the information about the number of stacked layers in the information recording and reading layer group 14 have been recorded as recorded pits or in a BCA (burst cutting area) on the servo layer 18 and are read each time tracking control is started. In the present embodiment, the basic information about a series of optical recording media includes the position of the servo layer, the positions of the first to sixth recording and reading layers 14A to 14F, and the rules as to the interlayer distances in the recording and reading layer group.

Next, information is recorded on the sixth recording and reading layer 14F while performing tracking control by using the servo layer 18. After the recording is completed, additional information (address information of the recording, content information, and others) is recorded on the servo layer 18, and then the process is completed. If the servo layer 18 has no recording film, it is desirable that the process be completed after the additional information is recorded on the sixth recording and reading layer 14F farthest from the light incident surface 10A, or on the first recording and reading layer 14A nearest the light incident surface 10A.

To read the information recorded on, for example, the sixth recording and reading layer 14F, first, the beam 270 from the second optical system 200 is used to read the basic information described above and the additional information of recording (for example, the information of the contents recorded on the sixth recording and reading layer 14F) from the servo layer 18. Then, on the basis of the read information, a predetermined address in the sixth recording and reading layer 14F is accessed by using the beam 170 of the first optical system 100 to perform reading. It is obvious at this time that the information is already recorded on the sixth recording and reading layer 14F. Accordingly, tracking control can be realized by using corresponding recording marks. Therefore, when the contents on the sixth recording and reading layer 14F are being read, the beam 270 from the second optical system 200 is not needed.

In the present embodiment, the servo layer 18 contains position information about the group including the six recording and reading layers, to which the invention is not limited. As an example, the servo layer 18 may contain position information about the sixth recording and reading layer farthest from the light incident surface, and information about the aforementioned first distance (12 μm) and the aforementioned second distance (16 μm) greater than the first distance. As already described, in this optical recording medium, an intermediate layer to define the second distance (16 μm) and an intermediate layer to define the first distance (12 μm) are alternately stacked from a side nearer the light incident surface 10A or farther from the light incident surface 10A. This rule may be used to estimate the positions, for example, of the second to sixth recording and reading layers 14B to 14F by a program with respect to the position of the first recording and reading layer 14A. Based on this estimation, the focus of the beam 170 from the first optical system 100 may be placed directly on the second to sixth recording and reading layers 14B to 14F for recording of information thereon. As a matter of course, estimation may be made with respect to the position of the sixth recording and reading layer 14F, or with respect to the position of a different recording and reading layer.

A relationship among an interlayer distance, a reflectance, and an index of refraction of the recording and reading layer group 14 of the optical recording medium 10, and crosstalk will next be described in detail.

<Explanation of Principles of Generation of Crosstalk>

Figure 3:
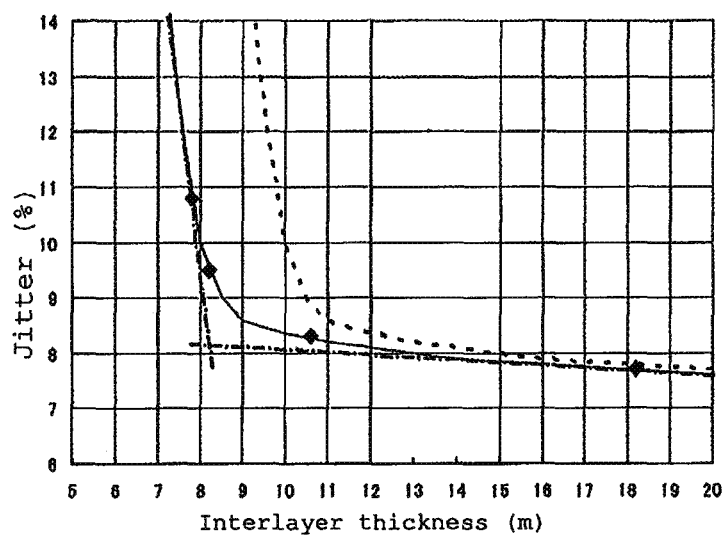
FIG. 3 shows a relationship between an interlayer thickness and a jitter of an optical recording medium, which is intended to explain the principles of generation of interlayer crosstalk.

Interlayer crosstalk due to reflection from an adjacent recording and reading layer generated in the recording and reading layer group 14 will be described first. If an interlayer distance between recording and reading layers is too short, it will be affected by the interlayer crosstalk from the adjacent recording and reading layer. Accordingly, an interlayer distance of a predetermined value or more is required. Experiment not publicly known was conducted to study an interlayer thickness and the effect of crosstalk, and a result is shown in FIG. 3. FIG. 3 shows a relationship between an interlayer thickness and a jitter in an optical recording medium in which recording and reading layers each have substantially the same reflectance. The horizontal and vertical axes of FIG. 3 indicate an interlayer thickness and a jitter value, respectively. It is clearly seen that a jitter worsens with reduction in interlayer thickness, an inflection point is placed at approximately 8 μm, and an interlayer thickness of 8 μm or smaller causes sudden worsening of a jitter.

Generally, the reflectances of recording and reading layers may be differ by about 1.5 times depending on the design and manufacture of an optical recording medium. As an example, if the reflectance of a recording and reading layer adjacent to a recording and reading layer targeted for recording or reading is 1.5 times that of the target recording and reading layer, the effect of interference is $\sqrt{1.5}$ times in terms of amplitude ratio of light. A dashed line of FIG. 3 shows a jitter corresponding to an interlayer thickness which is defined by taking an effect of such variations in reflectance into consideration. Accordingly, it is preferable that the minimum interlayer thickness in actual design be set to about 10 μm or more, which is greater than 8 μm by 2 μm. Accordingly, the density of the amount of light at the time of detection of stray light from a different recording and reading layer by a photodetector is determined as $1.5 \times (8/10)^2 = 0.96$. Thus, an increment of reflection efficiency of the different recording and reading layer can be canceled out by the increase in interlayer thickness. In conclusion, the minimum interlayer thickness is optimally 10 μm. Meanwhile, an error is also generated in the thicknesses of intermediate layers during deposition thereof. Accordingly, if a tolerance of these thicknesses that is about 2.0 μm is allowed for, it is preferable that each layer of the intermediate layer group 16 have a thickness of 12 μm that is the minimum design criterion for not making this thickness to be less than 10 μm.

Principles of generation of confocal crosstalk in the optical recording medium 10 will be described next by referring to FIGS. 4A and 4B. For the convenience of description, the thickness of the cover layer 11 is defined as Tc, and the first and second distances of the intermediate layer group are defined as $T_1$ and $T_2$, respectively. Further, n is a natural number, and a recording and reading layer that is at an $n^{th}$ place from the light incident surface 10A is defined as an $n^{th}$ recording and reading layer. Still further, the single-layer reflectance and the single-layer transmittance of the $n^{th}$ recording and reading layer is defined as $r_n$ and $t_n$, respectively. It is hard to obtain the actually measured values of the single-layer reflectance $r_n$ and the single-layer transmittance $t_n$ in the optical recording medium 10 with a large number of layers. In response, in the present embodiment, a total reflectance $R_n$ (namely, reflectance in a stacked state) that is a ratio between incoming light and outgoing light on the light incident surface 10A determined when the $n^{th}$ recording and reading layer is irradiated with a beam is used to virtually estimate the single-layer reflectance $r_n$ and the single-layer transmittance $t_n$. Thus, the total reflectance $R_n$ is an actually measured value including the component of stray light reflected from a recording and reading layer other than the $n^{th}$ recording and reading layer.

Figure 4A:
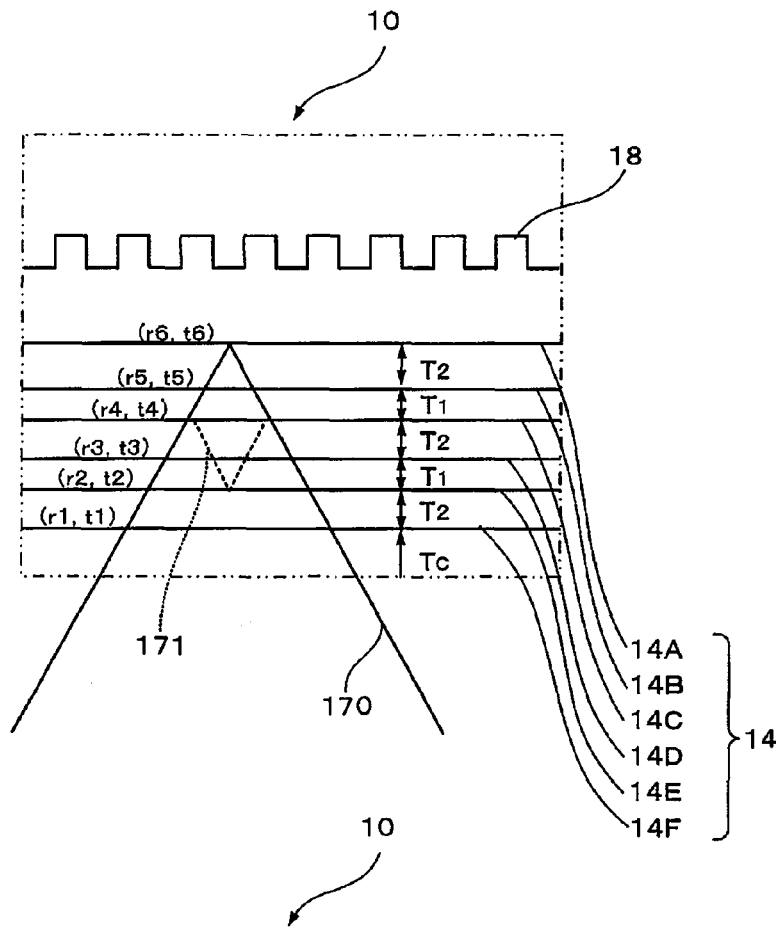
FIGS. 4A and 4B are sectional views each illustrating in an enlarged manner the stacking structure of the optical recording medium according to the first embodiment and a cause of generation of crosstalk.

As shown in FIG. 4A, the beam 170 focused on the sixth recording and reading layer 14A for recording or reading is split into a plurality of light beams as a result of semi-light-transmitting property of the recording and reading layers. As an example, part of the beam 170 targeted for recording or reading to and from the sixth recording and reading layer 14A is reflected from the fourth recording and reading layer 14C to become a split beam 171. Then, the split beam 171 is focused on the second recording and reading layer 14E, and resultant reflected light is again reflected from the fourth recording and reading layer 14C to join the beam 170, and is detected with the beam 170. This phenomenon is called rear focus light of recording and reading layers. The optical path lengths of the beams 170 and the split beam 171 are both expressed as Tc×2+$T_1$×4+$T_2$×6, meaning that crosstalk is likely to be generated.

Figure 4B:
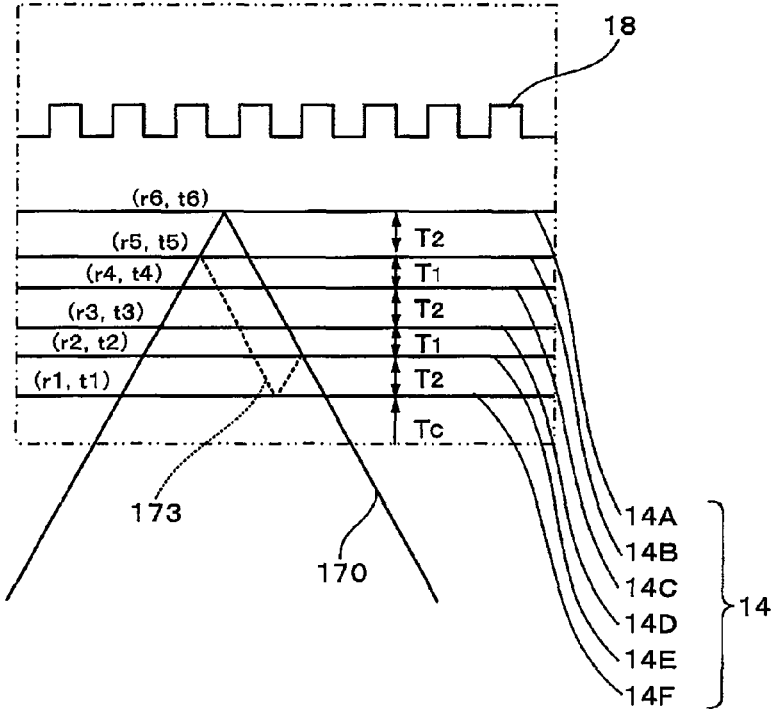

As shown in FIG. 4B, the beam 170 targeted for recording or reading to and from the sixth recording and reading layer 14A is split, for example, at the fifth recording and reading layer 14B to become a split beam 173. The split beam 173 is not focused on a different recording and reading layer, but is detected after being reflected from the first and second recording and reading layers 14F and 14E in this order. The optical path lengths of the beam 170 and the split beam 173 are both expressed as Tc×2+$T_1$×4+$T_2$×6, meaning that crosstalk is likely to be generated.

Assuming that $T_1$ equals to $T_2$, it is considered easily that various split beams other than those shown in FIGS. 4A and 4B have the same optical path length in the phenomena shown in FIGS. 4A and 4B. In other words, in the optical recording medium 10, split beams have the same optical path length with a significantly reduced probability by defining a difference of 3 μm or more, more specifically by defining a difference of 4 μM between the first and second distances $T_1$ and $T_2$. A difference of 3 μm or more is defined for the reason that 1.5 μm should be allowed for as a tolerance of each track during deposition of the intermediate layer group 16. More specifically, if an error of −1.5 μm is generated during deposition of the first intermediate layer 16A, for example, a resultant thickness of the first intermediate layer 16A is 14.5 μm. Also, if an error of +1.5 μm is generated during deposition of the second intermediate layer 16B, a resultant thickness of the second intermediate layer 16B is 13.5 μm. Thus, even taking an error during film deposition into consideration, intermediate layers adjacent to each other do not have the same thickness by making an allowance of 3 μm or more. It is preferable that a tolerance of about 2.0 μm of a surface in its entirety be allowed for during deposition of the intermediate layer group. Accordingly, it is preferable that a difference between the first and second distances $T_1$ and $T_2$ be 4 μm or more. Meanwhile, a difference in film thicknesses that is greater than necessary excessively increases an interlayer distance. In this regard, it is also desirable that a difference between the first and second distances $T_1$ and $T_2$ be 5 μm or less.

As already shown in FIGS. 4A and 9B, even if the different first and second distances $T_1$ and $T_2$ are alternately defined as interlayer distances, the optical path lengths of the split beams 171 and 173 as light reflected from multiple layers always coincide with the optical path length of the original beam 170. Thus, making the amounts of light of the split beams 171 and 173 as light reflected from multiple layers small compared to that of the beam 170 is an important issue. In the optical recording medium 10 of the present embodiment, the reflectance and the transmittance of each layer of the recording and reading layer group 14 are designed to satisfy the following two conditions, so that the amounts of light of the split beams 171 and 173 are reduced to a considerably low level. It is preferable that both of the first and second conditions be satisfied. However, satisfying one of these conditions is enough to reduce the amounts of light of the split beams 171 and 173.

(First condition) The total reflectance R is set at 2% or less in all layers of the recording and reading layer group.

(Second condition) The single-layer reflectance $r_n$ expressed as ($R_{n-1}^{(n-1)}/R_n^{(n-2)}$) is set at 10% or less in all the recording and reading layers.

The aforementioned conditions will be described more. For the sake of convenience, a single-layer reflectance and a single-layer transmittance are common in the recording and reading layer group 14, and the single-layer reflectance and the single-layer transmittance are defined as r and t, respectively.

The first condition will now be described. It is assumed, for example, that the incoming beam 170 has intensity of 1 in the state shown in FIG. 4A. Main recording and reading light (beam 170) for the sixth recording and reading layer 19F passes through the first to fifth recording and reading layers twice, and is reflected from the sixth recording and reading layer 14F once. Accordingly, energy J of outgoing light of the original recording and reading light is expressed as J=1×$t^{10}$×r. Likewise, energy K of outgoing light of the split beam 171 is expressed as K=1×$t^8$×$r^3$. That is, a ratio of the energy of the stray light to the energy of the original recording and reading light (K/J) is (r/$t^2$). This idea applies to all the layers of the recording and reading layer group 14 as well as to the state of FIG. 4B.

It is seen accordingly that reducing the single-layer reflectance r and increasing the single-layer transmittance t is a preferable way of reducing the ratio of the energy of a split beam that becomes the component of stray light. If the first condition is satisfied to set the total reflectance R at 2% or less in all the layers of the recording and reading layer group 14, a resultant single-layer reflectance of each layer of the recording and reading layer group falls within a range of from about 2% to about 20% without determining the single-layer reflectance r. Thus, the present inventors make it clear by experiment that the ratio of the energy of a split beam can be reduced to a level that does not generate crosstalk.

The second condition is described next. As already shown in FIGS. 4A and 4B, energy J of the original recording and reading light at the sixth recording and reading layer 14F is expressed as J=1×$t^{10}$×r. The energy J can be regarded as being substantially the same as a total reflectance $R_6$. Accordingly, $R_6$ is determined as $t^{10}$×r. Likewise, a total reflectance $R_5$ at the fifth recording and reading layer 14E, a total reflectance $R_4$ at the fourth recording and reading layer 14D, and a total reflectance $R_3$ at the third recording and reading layer 14C are determined as $t^8$×r, $t^6$×r, and $t^4$×r, respectively. It is seen, for example, that a ratio of the total reflectance $R_5$ of the fifth recording and reading layer 14E to the total reflectance $R_4$ of the fourth recording and reading layer 14D ($R_5/R_4$) is $t^2$. That is, a ratio between the total reflectances of adjacent recording and reading layers is always expressed as ($R_n/R_{n-1}$)=$t^2$. The total reflectance of the fifth recording and reading layer 19E is expressed as $R_5$=$t^8$×r. Accordingly, the single-layer reflectance thereof is expressed as r=$R_5$×(1/$t^8$). If the aforementioned formula ($R_5/R_4$)=$t^2$ is substituted into this expression, the following expression r=$R_4^4/R_5^3$ is established. Likewise, a relationship between the fourth and third recording and reading layers 14D and 14C is expressed as r=$R_3^3/R_4^2$. Further, a relationship between the sixth and fifth recording and reading layers 14F and 14E is expressed as r=$R_5^5/R_6^4$. That is, a virtual single-layer reflectance $r_n$ is defined as ($R_{n-1}^{(n-1)}/R_n^{(n-2)}$) by generalizing these relationships. The amount of light of a split beam to be subjected to three or more reflections is reduced if the single-layer reflectance $r_n$ is set to 10% or less, thereby reducing crosstalk.

As described above, in the optical recording medium 10 of the present embodiment, the first distance, and the second distance greater than the first distance by 3 μM or more are alternately arranged as interlayer distances of the recording and reading layer group 14. Thus, the first and second distances do not become the same distance even on the occurrence of an error in film thickness of smaller than 1.5 μm during deposition of the intermediate layer group 16. As a result, increase in confocal crosstalk is prevented. The first distance is set at 10 μm or more, actually at 12 μm. This can reduce interlayer crosstalk generated due to smaller distance from an adjacent recording and reading layer.

In the optical recording medium 10, the first distance is set optimally at 12 μm that is within a range of from 10 μm to 14 μm, and the second distance is set optimally at 16 μm that is within a range of from 14 μm to 18 μm. This allows reduction in interlayer distance while suppressing generation of crosstalk, so that the number of recording and reading layers can be increased. In the case of BD, for example, it is preferable that a distance from a light incident surface to a recording and reading layer farthest from the light incident surface be in a range of 110 μm or less. Meanwhile, the recording and reading layer group 14 even with six layers can make such a distance fall within this range as shown in the present embodiment.

Further, in this optical recording medium, the total reflectance R of the recording and reading layer group 14 is set at 2% or less. This reduces the effect of confocal crosstalk that may be generated by limiting the number of types of interlayer distances to two. That is, mutually contradictory issues including minimization of an interlayer distance and suppression of confocal crosstalk are resolved rationally by limiting the number of types of film thicknesses of the intermediate layer group 16 to two, and by setting the total reflectance R at 2% or less.

In the present embodiment, the single-layer reflectance $r_n$ expressed as $(R_{n-1}^{(n-1)}/R_n^{(n-2)})$ is set at 10% or less in each layer of the recording and reading layer group 14. This reduces the component of stray light that repeats reflection three times or more, thereby suppressing confocal crosstalk.

The recording and reading layer group 14 of the optical recording medium 10 has a planar structure with no projections and depressions for tracking control. Information is recorded on the recording and reading layer group 14 by tracking of the servo layer 18 using both lands and grooves thereof. This makes a stamper unnecessary for deposition of the intermediate layer group 16. Accordingly, the thickness of the intermediate layer group 16 can fall within a desirable range of tolerance even with the aforementioned minimized interlayer distances of 12 μm and 16 μm.

Further, a track pitch of projections and depressions for tracking defined in the servo layer 18 is set to a value twice the track pitch of the recording and reading layer group 14 for recording. Therefore, a low-cost long-wavelength red beam 270 can be used for the servo layer. Since tracking is performed using both the land and groove, recording can be performed on the recording and reading layer group 14 at a track pitch one-half that of the servo layer. By setting the track pitch of the servo layer 18 to 0.64 μm, existing products for the DVD standard can be used as the second optical system 200 with almost no change. The track pitch of the recording and reading layer group 14 is 0.32 μm. Therefore, existing products for the BD standard can be used as the first optical system 100 with almost no change. No additional development expense is required for the optical pickup 90, and the optical pickup 90 can be applied to the present recording medium 10 while existing parts can be effectively used.

The first and second distances are defined alternately as interlayer distances of the recording and reading layer group 14. This allows the optical pickup 90 to estimate the position of the recording and reading layer group 14 by calculation, thereby increasing recording and reading speeds.

Figure 5:
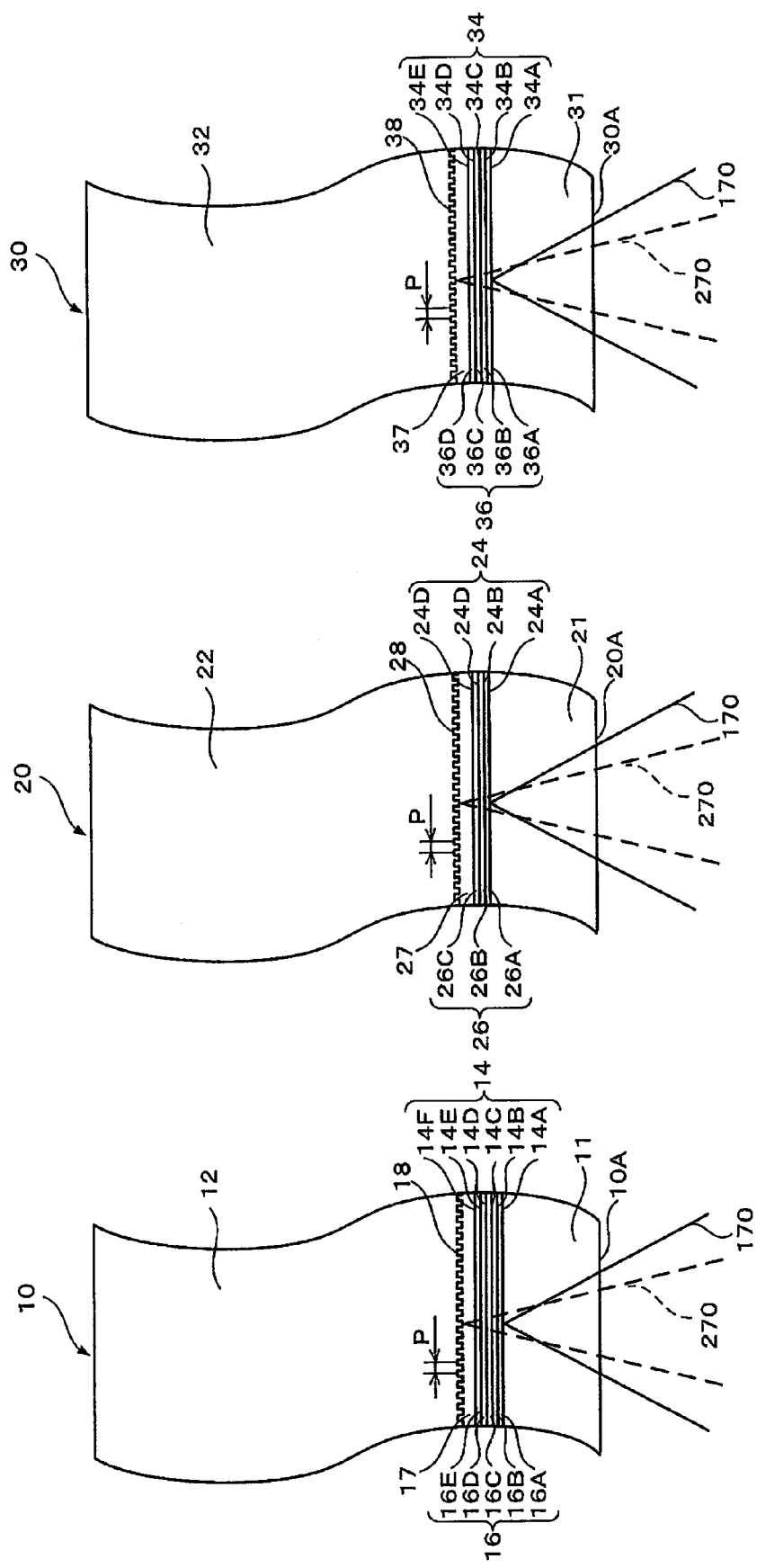
FIG. 5 is a set of cross-sectional views illustrating the stacking structures of optical recording media belonging to a series of optical recording media according to a second embodiment.

A second embodiment of the invention will be described with reference to FIG. 5. The second embodiment is a series of optical recording media including a first optical recording medium that is the optical recording medium 10 of the first embodiment, and second and third optical recording media 20 and 30. The structure of the first optical recording medium 10 is not described. The structures of the second and third optical recording media 20 and 30 are described with emphasis placed on differences from the first optical recording medium 10. Correlating members among the first to third optical recording media 10, 20 and 30 are identified by reference numerals with common last digits.

The second optical recording medium 20 has the same structure as that of the first optical recording medium 10, except that the recording and reading layer group 24 includes four layers (first to fourth recording and reading layers 24A to 24D), the intermediate layer group 26 interposed between these recording and reading layers includes three layers (first to third intermediate layers 26A to 26C), and the cover layer 21 has a different film thickness. Specifically, like in the first optical recording medium 10, the thicknesses of the first to third intermediate layers 26A to 26C are 16 μm, 12 μm, and 16 μm, respectively. As a result, like in the first optical recording medium 10, interlayer distances of the first to fourth recording and reading layers 24A to 24D are determined by the first distance (16 μm) and the second distance (12 μm) different from the first distance that are alternately defined from a light incident surface. A difference between the first and second distances is set at 4 μm.

Accordingly, a servo layer 28 is positioned at a distance of 0.2 mm (200 μm) from a light incident surface 20A. The fourth recording and reading layer 24D farthest from the light incident surface 20A of the recording and reading layer group 24 is positioned at a distance of 0.11 mm (110 μm) from the light incident surface 20A. The third and second recording and reading layers 24C and 24B are positioned at distances of 94 μm and 82 μm from the light incident surface 20A, respectively. The first recording and reading layer 24A nearest the light incident surface 20A is positioned at a distance of 66 μm from the light incident surface 20A. The total thickness of the recording and reading layer group 24 (distance between the first and fourth recording and reading layers 24A and 24D) is 44 μm.

The third optical recording medium 30 will next be described. The third optical recording medium 30 has the same structure as that of the first optical recording medium 10, except that the recording and reading layer group 34 includes five layers (first to fifth recording and reading layers 34A to 34E), the intermediate layer group 36 interposed between these recording and reading layers includes four layers (first to fourth intermediate layers 36A to 36D), and the cover layer 31 has a different film thickness. Specifically, like in the first optical recording medium 10, the thicknesses of the first to fourth intermediate layers 36A to 36D are 12 μm, 16 μm, 12 μm, and 16 μm, respectively. As a result, like in the first optical recording medium 10, interlayer distances of the first to fifth recording and reading layers 34A to 34E are determined by the first distance (12 μm) and the second distance (16 μm) different from the first distance that are alternately defined from a light incident surface. A difference between the first and second distances is set at 4 μm.

Accordingly, a servo layer 38 is positioned at a distance of 0.2 mm (200 μm) from a light incident surface 30A. The fifth recording and reading layer 34E farthest from the light incident surface 30A of the recording and reading layer group 34 is positioned at a distance of 0.11 mm (110 μm) from the light incident surface 30A. The fourth, third, and second recording and reading layers 34D, 34C, and 34B are positioned at distances of 94 μm, 82 μm, and 66 μm from the light incident surface 30A, respectively. The first recording and reading layer 34A nearest the light incident surface 30A is positioned at a distance of 54 μm from the light incident surface 20A. The total thickness of the recording and reading layer group 34 (distance between the first and fifth recording and reading layers 34A and 34E) is 56 μm.

Figure 6:
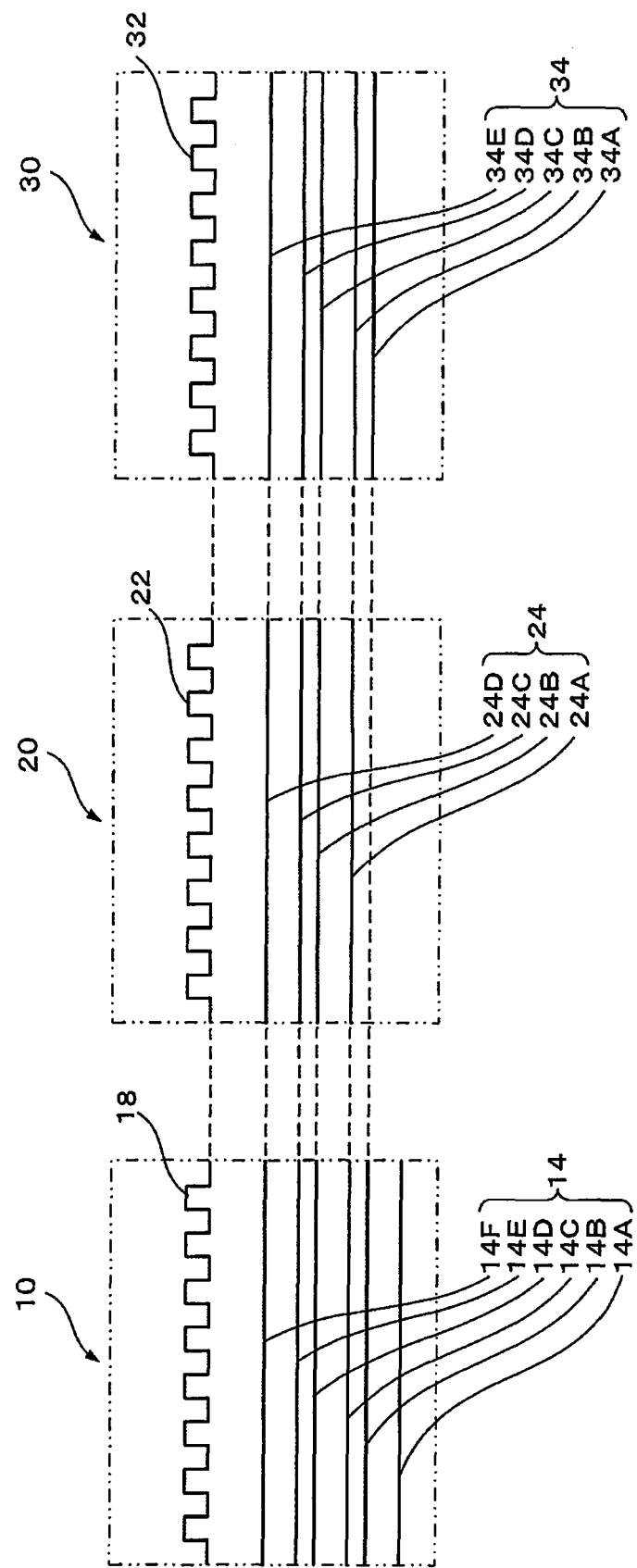
FIG. 6 is a set of cross-sectional views illustrating in an enlarged manner the stacking structures of optical recording media belonging to a series of optical recording media according to the second embodiment

A relationship among the interlayer distances of the recording and reading layer groups in the series of optical recording media of the second embodiment will now be described with reference to FIG. 6.

The first to third optical recording media 10, 20 and 30 each have a plurality of stacked recording and reading layers. Further, while the optical recording media have different numbers of stacked layers, the positions of the servo layers 18, 28 and 38 with respect to the corresponding light incident surfaces are standardized. Further, the optical recording media 10, 20 and 30 have standardized positions of at least three recording and reading layers with respect to the corresponding light incident surfaces.

Accordingly, in an optical recording medium belonging to this series of optical recording media, a servo layer is placed at a position standardized in the series. In addition to the advantage shown in the first embodiment, this allows the second optical system 200 of the optical pickup 90 to easily find the position of a servo layer, thereby achieving tracking control at high speed. Further, the standardized positions of at least three recording and reading layers allow the first optical system 100 of the optical pickup 90 to easily find the positions of these recording and reading layers, thereby making preparations for recording and reading at high speed. As described, if the positions of a servo layer and of at least one recording and reading layer are standardized, an initial operation of recording or reading can be conducted at considerably high speed according to a combination of the servo layer and the recording and reading layer. That is, in addition to producing an optical advantage, standardizing the first and second distances to become interlayer distances of recording and reading layers among a plurality of optical recording media makes it easy to form a series of the plurality of optical recording media.

The aforementioned standardized positions of three recording and reading layers allow the optical pickup 90 to easily select three recording and reading layers. As an example, if recording on any one of three recording and reading layers is completed, the remaining recording and reading layers may be selected to start recording of information on the selected layers. The standardized positions of three recording and reading layers also allow the optical pickup 90 to know an interlayer distance between different recording and reading layers in advance, or predict such a distance by referring to interlayer distances (first and second distances) of the three recording and reading layers.

Further, recording and reading layers farthest from the corresponding light incident surfaces are at a position with respect to the corresponding light incident surfaces that is standardized among the first to third optical recording media 10, 20 and 30. Accordingly, in an optical recording medium belonging to this series of optical recording media, the optical pickup 90 is allowed to recognize in advance that a different recording and reading layer is placed on the farthest recording and reading layer at a position nearer the light incident surface than that of the farthest recording and reading layer. This reduces an operating time required to find the different recording and reading layer.

Additionally, the first to third optical recording media 10, 20 and 30 have the film thicknesses of intermediate layers that are standardized as the first and second distances. Accordingly, standards assure that, in an optical recording medium belonging to this series of optical recording media, a recording and reading layer is not interposed in the first or second distance. This allows the optical pickup 90 to prevent a recording or reading error that is generated by an unpredictable recording and reading layer that is placed after making access to a recording and reading layer being recorded or being read.

Regarding two optical recording media arbitrarily selected from the first to third optical recording media 10, and 30, the positions of all recording and reading layers with respect to the corresponding light incident surface in the optical recording medium that has a smaller number of recording and reading layers are the same as the corresponding positions of recording and reading layers in the optical recording medium that has a larger number of recording and reading layers. By way of example, if the first and second optical recording media 10 and 20 are selected, all the positions of the first to fourth recording and reading layers 24A to 24D in the second optical recording medium 20 that has a smaller number of recording and reading layers are the same as those of the third to sixth recording and reading layers 14C to 14F of the first optical recording medium 10. If the first and third optical recording media 10 and 30 are selected, all the positions of the first to fifth recording and reading layers 34A to 34E in the third optical recording medium 30 that has a smaller number of recording and reading layers are the same as those of the second to sixth recording and reading layers 14B to 14F of the first optical recording medium 10. If the second and third optical recording media 20 and 30 are selected, all the positions of the first to fourth recording and reading layers 24A to 24D in the second optical recording medium 20 that has a smaller number of recording and reading layers are the same as those of the second to fifth recording and reading layers 34B to 34E of the third optical recording medium 30. That is, in this series of optical recording media, distances of a servo layer and of all layers of the recording and reading layer group from the corresponding light incident surface in an optical recording medium that has a smaller number of stacked recording and reading layers are the same as those in an optical recording medium that has a larger number of stacked layers. This allows efficient standardization of the positions of all layers of a recording and reading layer group in an optical recording medium belonging to the series of optical recording media. Accordingly, when position information about the recording and reading layer groups 14, 24 and 34 is stored on the servo layers, BCAs and the like of the first to third optical recording media 10, 20 and 30, or on the optical pickup 90, the amount of information to be recorded can be reduced.

In the series of optical recording media of the second embodiment, the servo layers of the first to third optical recording media 10, 20 and 30 are positioned at respective distances greater than those of the recording and reading layer groups 14, 24 and 34 from the corresponding light incident surfaces, respectively. This reduces an adverse effect to be exerted by projections and depressions for tracking control on the beam 170 for recording and reading applied to the groups of recording and reading layers. The servo layers are not necessarily arranged in the aforementioned manner, but may be disposed at distances smaller than those of the groups of recording and reading layers from the corresponding light incident surfaces.

In the optical recording medium of the present embodiment, interlayer distances of 16 μm and 12 μm are alternately defined, to which the invention is not limited. The invention may employ a different distance.

The optical recording medium of the present embodiment includes a servo layer dedicated to tracking, to which the invention is not limited. The invention may include a recording and reading layer with projections and depressions such as lands and grooves.

In the present embodiment, a servo layer is disposed at a distance greater than that of a recording and reading layer group from a light incident surface, to which the invention is not limited. Alternatively, in the invention, the servo layer may be disposed at a distance smaller than that of the recording and reading layer group from the light incident surface.

The series of optical recording media of the present embodiment includes three types of optical recording media with different numbers of stacked layers that constitute recording and reading layer groups, to which the invention is not limited. In the invention, the series may include optical recording media of two types, or optical recording media of four or more types. The numbers of stacked layers of recording and reading layer groups are limited to four, five and sixth, to which the invention is not limited.

The optical recording medium and the series of optical recording media of the invention are applicable to various types of optical recording media with a plurality of recording and reading layers, and which conduct recording and reading with a beam.

The entire disclosure of Japanese Patent Application No. 2010-035812 filed on Feb. 22, 2010 including specification, claims, drawings, and summary are incorporated herein by reference in its entirety.

What is claimed is:

1. An optical recording medium comprising three or more recording and reading layers, wherein
a first fixed distance is set to a fixed first numerical value and a second fixed distance is set to a fixed second numerical value by 3 μm or more in comparison with the first fixed distance;
interlayer distances of a stack of the three or more recording and reading layers alternate between the fixed first distance and the second fixed distance for adjacent ones of the recording and reading layers in the stack, wherein the first and second distances are 12 μm and 16 μm, respectively.

2. An optical recording medium comprising three or more recording and reading layers, wherein
a first fixed distance is set to a fixed first numerical value and a second fixed distance is set to a fixed second numerical value by 3 μm or more in comparison with the first fixed distance;
interlayer distances of a stack of the three or more recording and reading layers alternate between the fixed first distance and the second fixed distance for adjacent ones of the recording and reading layers in the stack, wherein a total reflectance R is set at 2% or less in all the recording and reading layers, the total reflectance R indicating a ratio between incoming light and outgoing light on a light incident surface determined when the recording and reading layers are irradiated with a beam.

3. An optical recording medium comprising three or more recording and reading layers, wherein
a first fixed distance is set to a fixed first numerical value and a second fixed distance is set to a fixed second numerical value by 4 μm or more in comparison with the first fixed distance;
interlayer distances of a stack of the three or more recording and reading layers alternate between the fixed first distance and the second fixed distance for adjacent ones of the recording and reading layers in the stack, wherein a total reflectance R is set at 2% or less in all the recording and reading layers, the total reflectance R indicating a ratio between incoming light and outgoing light on a light incident surface determined when the recording and reading layers are irradiated with a beam.

4. An optical recording medium comprising three or more recording and reading layers, wherein
a first fixed distance is set to a fixed first numerical value and a second fixed distance is set to a fixed second numerical value, the second distance is greater than the first distance by a range of from 3 μm to 5 μm;
interlayer distances of a stack of the three or more recording and reading layers alternate between the fixed first distance and the second fixed distance for adjacent ones of the recording and reading layers in the stack, wherein a total reflectance R is set at 2% or less in all the recording and reading layers, the total reflectance R indicating a ratio between incoming light and outgoing light on a light incident surface determined when the recording and reading layers are irradiated with a beam.

5. The optical recording medium according to claim 1, wherein a total reflectance R is set at 2% or less in all the recording and reading layers, the total reflectance R indicating a ratio between incoming light and outgoing light on a light incident surface determined when the recording and reading layers are irradiated with a beam.

6. An optical recording medium comprising three or more recording and reading layers, wherein
a first fixed distance is set to a fixed first numerical value and a second fixed distance is set to a fixed second numerical value by 3 μm or more in comparison with the first fixed distance;
interlayer distances of a stack of the three or more recording and reading layers alternate between the fixed first distance and the second fixed distance for adjacent ones of the recording and reading layers in the stack, wherein, when a recording and reading layer that is at an $n^{th}$ place from the light incident surface is defined as an $n^{th}$ recording and reading layer (n is a natural number), a total reflectance indicating a ratio between incoming light and outgoing light on the light incident surface determined is defined as $R_n$ and a virtual single-layer reflectance of the $n^{th}$ recording and reading layer is defined as $r_n$ when the $n^{th}$ recording and reading layer is irradiated with a beam, and the single-layer reflectance rn is expressed as $$(R_{n-1}^{(n-1)}/R_n^{(n-2)})$$

the single-layer reflectance $r_n$ is set at 10% or less in all the recording and reading layers.

7. An optical recording medium comprising three or more recording and reading layers, wherein
a first fixed distance is set to a fixed first numerical value and a second fixed distance is set to a fixed second numerical value by 4 μm or more in comparison with the first fixed distance;
interlayer distances of a stack of the three or more recording and reading layers alternate between the fixed first distance and the second fixed distance for adjacent ones of the recording and reading layers in the stack, wherein, when a recording and reading layer that is at an $n^{th}$ place from the light incident surface is defined as an $n^{th}$ recording and reading layer (n is a natural number), a total reflectance indicating a ratio between incoming light and outgoing light on the light incident surface determined is defined as $R_n$ and a virtual single-layer reflectance of the $n^{th}$ recording and reading layer is defined as $r_n$ when the $n^{th}$ recording and reading layer is irradiated with a beam, and the single-layer reflectance $r_n$ is expressed as $$(R_{n-1}^{(n-1)}/R_n^{(n-2)})$$

the single-layer reflectance $r_n$ is set at 10% or less in all the recording and reading layers.

8. An optical recording medium comprising three or more recording and reading layers, wherein a first fixed distance is set to a fixed first numerical value and a second fixed distance is set to a fixed second numerical value, the second distance is greater than the first distance by a range of from 3 μm to 5 μm; interlayer distances of a stack of the three or more recording and reading layers alternate between the fixed first distance and the second fixed distance for adjacent ones of the recording and reading layers in the stack, wherein, when a recording and reading layer that is at an $n^{th}$ place from the light incident surface is defined as an $n^{th}$ recording and reading layer (n is a natural number), a total reflectance indicating a ratio between incoming light and outgoing light on the light incident surface determined is defined as $R_n$ and a virtual single-layer reflectance of the $n^{th}$ recording and reading layer is defined as $r_n$ when the $n^{th}$ recording and reading layer is irradiated with a beam, and the single-layer reflectance rn is expressed as $$(R_{n-1}^{(n-1)}/R_n^{(n-2)})$$

the single-layer reflectance $r_n$ is set at 10% or less in all the recording and reading layers.

* * * * *